United States Patent [19]
Asai et al.

[11] Patent Number: 5,592,868
[45] Date of Patent: Jan. 14, 1997

[54] APPARATUS FOR COOKING FOOD MATERIALS

[76] Inventors: Yasuhiro Asai, 1-8, Ibukino, Midori-ku, Yokohama-shi, Kanagawa-ken; Masayuki Akasaka, 5-20, Shimomeguro 3, Meguro-ku, Tokyo, both of Japan

[21] Appl. No.: 438,958

[22] Filed: May 11, 1995

Related U.S. Application Data

[62] Division of Ser. No. 111,930, Aug. 26, 1993, Pat. No. 5,436,016.

[30] Foreign Application Priority Data

Aug. 28, 1992  [JP]  Japan .................................. 4-230276

[51] Int. Cl.$^6$ ........................................ A47J 27/62
[52] U.S. Cl. ........................ 99/348; 99/409; 366/101
[58] Field of Search ....................... 99/348, 409; 366/101

[56] References Cited

U.S. PATENT DOCUMENTS

| | | | |
|---|---|---|---|
| 3,438,612 | 4/1969 | Knowlden | 366/101 |
| 4,136,970 | 1/1979 | Cabrera et al. | 366/101 |
| 4,314,766 | 2/1982 | Lapeyre et al. | 366/101 |
| 4,817,510 | 4/1989 | Kowalics et al. | 99/348 |
| 5,009,508 | 4/1991 | Wojdylo | 366/101 |

*Primary Examiner*—David Scherbel
*Assistant Examiner*—Reginald L. Alexander
*Attorney, Agent, or Firm*—Nikaido, Marmelstein, Murray & Oram LLP

[57] ABSTRACT

Cooking apparatus capable of saving calorie necessary for cooking and generating desired convection in to-be-treated materials and stirring them during cooking are disclosed. The cooking method sends a gas into the to-be-heated materials inside the cooking container to generate bubbles, and heats and cooks the to-be-heated materials while fluidizing and stirring them by ascending streams of the bubbles. According to this cooking method, the heating temperature and the intensity of the stirring stream can be combined freely under the most suitable condition for respective cooking, and freedom of cooking can be drastically improved.

6 Claims, 6 Drawing Sheets

APPARATUS FOR COOKING FOOD MATERIALS

This is a division of application Ser. No. 08/111,930 filed Aug. 26, 1993 now U.S. Pat. No. 5,436,016.

BACKGROUND OF THE INVENTION

This invention relates to a cooking method and a cooking apparatus capable of saving calorie necessary for cooking, generating desired convection in to-be-heated materials and stirring them during cooking.

When heat-cooking to-be-cooked materials stored in a cooking container, mere heating has been made in the past.

When noodles are boiled, for example, they are heated by boiling water, boiling convection is generated by heating and hot water is fluidized and stirred by this boiling convection so as to loosen the noodles. When such boiling convection (a two-phase stream consisting of hot water and vapor) is generated, latent heat of vaporization must be applied to generate the vapor. Therefore, greater heat energy than really necessary is required. To convert starch to starch paste and to make it easily digestible and absorptible by heating, a boiling temperature of the noodles may sufficiently be around 80° C. (176° F.). In other words, water need not be boiled so as to convert the starch to the starch paste (alpha-starch).

Next, let's take the case, as an example, of cooking of fish soup as a typical example of cooking of soup. It is known that delicious soup can be cooked when heating is gently and slowly made at a relatively low temperature of about 70° C. (158° F.) in the course of a long time. At this time, predetermined convection must be generated inside the cooking container while preventing turbulence in soup inside the container, and stirring must be made lest any turbidity occurs in soup. Such a procedure is directed to prevent ingredients of the soup stock from being disintegrated by boiling and to prevent fine pulverizates from mixing with soup and deteriorating the taste. In this way, soup has high transparency and is visually beautiful. However, it is difficult to generate sufficient convection for stirring soup at such a relatively low temperature of about 70° C. (158° C.). When soup is boiled to obtain strong stirring forcer the taste becomes poor and disintegration of the soup stock occurs due to boiling and soup becomes turbid. As a result, the taste and appearance of soup are deteriorated.

In cooking of stew of meat, on the other hand, it is known that the stew becomes tasty when it is cooked at a temperature of around 65° C. (149° F.). To fully make available the taste of the meat, it is important to make cooking at a temperature near the solidification point of the proteins of the meat, that is, about 65° C. (149° F.). If cooking is made at an excessively high temperature, the meat undergoes shrinkage and becomes harder, and its taste becomes poor. Moreover, the meat becomes difficult to digest. To have the meat impregnated with the broth, however, stirring must be made to a certain extent, and a cook must keep manual stirring at the low temperature described above. In other words, there remains the problem of labor.

When frying tempura and other foods, the temperature for frying is different depending on the materials to be fried. For example, the frying temperature is suitably around 190° C. (374° F.) in the case of a croquette and is around 160° C. (320° F.) for a doughnut, as is well known. To fry the foods at the respective temperatures suitable for them, therefore, the oil temperature must be kept at a predetermined constant temperature. To keep the oil temperature at a temperature suitable for frying, large quantities of cooking materials are divided into small pieces and are then put into the oil, instead of putting them all at one time, to prevent sudden oil temperature full. In the case of tempura and other fried foods, the cooking materials are heated while they float up to the upper layer of the oil. For this reason, the oil temperature at the upper layer portion drastically drops immediately after the cooking materials are put into the oil. However, the temperature of the oil of the lower layer portion near the heat source is kept at a relatively high level. In other words, there is a considerable temperature difference of the oil temperature depending on positions inside the cooking container. To keep constant the oil temperature at the upper layer portion at which the cooking materials float, the oil at the lower layer portion near the heat source is generally heated more than necessary.

The conventional cooking methods, inclusive of the methods described above, all heat merely the cooking container storing therein the cooking materials, and involve the problem that a great energy loss exists for heating because they use calorie more than necessary for cooking. Another problem is that a combination of a temperature suitable for cooking and a desirable stirring stream cannot be obtained by imparting latent heat of vaporization to hot water to generate vapor and effecting agitation by boiling convection of hot water and vapor (a two-phase stream consisting of a mixture of a liquid phase and a gaseous phase). Further, when cocking is made at a relatively low temperature, a cook stirs the cooking materials so as to generate the stirring stream, and the problem of labor remains unsolved.

SUMMARY OF THE INVENTION

In view of the problems described above, the present invention aims at providing a cooking method and a cooking apparatus capable of generating a two-phase stream consisting of a mixture of a liquid phase and a gaseous phase without boiling hot water, capable of freely combining a heating temperature and the intensity of a stirring stream under the most suitable condition for respective foods, and capable of fluidizing and stirring cooking materials without stirring by a cook under a non-boiling state.

The cooking method of the present invention for accomplishing the object described above comprises feeding a gas into to-be-heated materials inside a cooking container to generate bubbles, and heating and cooking the to-be-heated materials while fluidizing and stirring the to-be-heated materials by ascending streams of the bubbles. The cooking apparatus according to the present invention is characterized in that a bubble generator having formed therein air ports for sending a gas into to-be-heated materials stored inside a cooking container to generate bubbles is provided to the cooking container in a position where the to-be-heated materials can be easily fluidized and stirred.

The to-be-heated material described above is water in the case of boiling, is an oil in the case of frying and is soup or broth in the case of stewing. In other words, the term includes both food materials and solvents.

The bubble generator may be made of a porous metal, ceramics, glass, etc, and pores of these materials per se can be used as the air ports, or small holes may be bored in an air pipe to use them as the air ports. A nozzle-like bubble generator may also be used and in such a case, an opening of the nozzle may be used as the air port. In short, the requirement for the bubble generator is that it can generate the bubbles inside the to-be-heated materials, and the present invention is not particularly limited to the examples given above.

The bubble generator may be formed integrally with the cooking container or may be of a detachable type separate from the cooking container. When providing this bubble generator to the cooking container, the bubble generator may be stored inside the cooking container, or it is possible to employ the construction wherein a casing is fitted to the outside of the cooking container, the bubble generator is disposed inside this casing and the casing is allowed to communicate with the cooking container.

When boiling the noodles, for examples, the position of installation of this bubble generator is preferably such that a plurality of bubble generators are annularly disposed along the periphery of the cooking container but in the case of soup, the bubble generator is preferably disposed at the center of the cooking container. In short, a suitable position may be selected so that the to-be-heated materials can be easily fluidized and stirred in accordance with cooking materials. The bubble generator may be of a movable type so that the position of its installation can be changed.

As a method of sending a gas into the to-be-heated materials from the bubble generator, it is a general practice to send the gas to the bubble generator from outside it. In such a case, a compressor or a high pressure gas bomb is preferably used.

However, such a method is not particularly limitative. For example, a metal capable of easily absorbing a gas, such as palladium, platinum, silver, titanium, zirconium, etc, is stored in the bubble generator and the gas is in advance absorbed by such a metal, or a liquid or a solid having a low boiling point is in advance stored in an insulating (slightly heat-transferable, in practice) capsule so that the gas is gradually vaporized by the heat transferred little by little and discharged as the gas. In such a case, it is not necessary to supply from outside the gas to the bubble generator.

Though the quantity of the gas sent from the bubble generator in the manner described above may be of a fixed quantity type for sending a predetermined quantity of gas, a variable quantity type is preferably used so that the fluidization/stirring operation can be selected suitably for respective cooking.

When the gas is sent to the bubble generator from outside the cooking container, its flow rate is preferably regulated by a throttle valve, etc. When the bubbles are generated from the bubble generator per se without sending the gas from outside, on the other hand, opening of the blast ports to be bored in the bubble generator is preferably adjusted.

The control of the air quantity and the calorie for heating may be effected manually, but automatic control can also be made by detecting the temperature of the to-be-heated materials by a temperature sensor and detecting the air quantity by a flow rate sensor.

The gas to be sent from the bubble generator may be air when water is used as the to-be-heated material as in the case of boiling, but when an oil is used such as in the case of frying, an inert gas or a nitrogen gas is preferably used so as to prevent oxidation of the oil.

Though the cooking container need not be provided with a cover, the cover is preferably provided because suitable stirring force can be obtained by the bubble generator even though a cook does not stir, and because energy saving can be further improved. In such a case, cooking may be carried out while the pressure inside the cooking container is kept at a normal pressure, or cooking may be carried out at an elevated or reduced pressure by disposing pressure regulation means such as a pressure regulation valve. When pressure regulation is made in this way, the boiling point can be controlled.

When the cooking method of the present invention is employed, the bubbles can be generated by sending a gas from the bubble generator into the to-be-heated materials inside the cooking container, and the bubbles expand duo to the heat of the to-be-heated material. The bubbles ascending in the to-be-heated material expand while they rise from the lower layer portion to the upper layer portion, and the to-be-heated material can be heated and cooked while being fluidized and stirred by the ascending streams of the bubbles.

Since the to-be-heated material can be fluidized and stirred under the non-boiling state, calorie necessary for cooking can be drastically saved. Further, since the to-be-heated material can be fluidized and stirred by generating the bubble jet streams, a cook need not to stir, and this is advantageous for saving labor.

When noodles are boiled, for example, the noodles can be stirred and loosened by merely placing them into depots (metal net-like cages) and disposing these depots at the upper layer portion of the cooking container.

In the case of frying, the bubbles are generated in the same way to fluidize and stir the oil as the to-be-heated material. In this way, the oil temperature of the upper layer portion at which the cooking materials float can be prevented from quickly dropping in comparison with the oil temperature at the lower layer portion.

To cook soup, the quantity of the gas sent from the bubble generator is rather reduced so as to generate gentle convection. In this way, it is possible to prevent disintegration of the ingredients of the soup stock due to boiling, to prevent soup from becoming turbid and to prevent finely pulverized soup stock from mixing with soup. When cooking is made at a relatively low temperature, convection generated by heating is weak, and sufficient stirring force cannot be obtained. In such a case, too, convection can be positively generated by generating the bubbles.

When cooking foods, the bubbles are generated by the bubble generator and a predetermined convection is generated in order to prevent the occurrence of turbulent flows. In this way, disintegration of the cooking materials due to boiling and scorching can be prevented.

Even when a fluid viscosity of the food material is high and fluidization/stirring is difficult as in the case of cooking of rice using a deep pan, the present invention can easily generate fluidization and stirring.

Besides the kinds of cooking described above, the present invention can generates the bubble jet streams consisting of the mixture of the liquid phase and the gaseous phase in other kinds of cooking without the necessity for boiling the to-be-heated materials. Accordingly, the present invention can freely combine the heating temperature and the intensity of the stirring streams under the most suitable conditions for respective cooking, and can make uniform the temperature and concentration of the to-be-heated material inside the cooking container.

DESCRIPTION OF THE PREFERRED EMBODIMENTS

Figure 1:
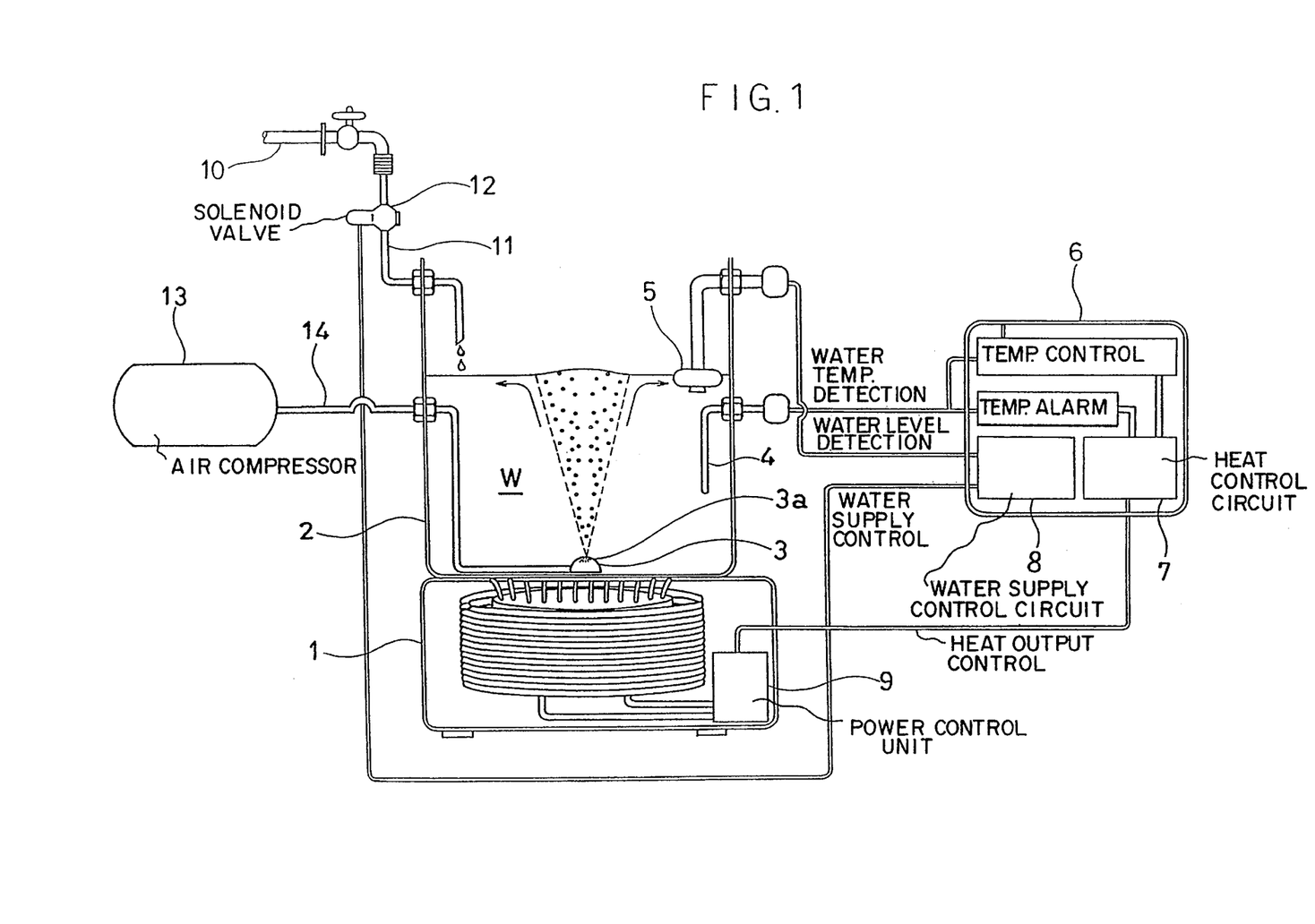
FIG. 1 is a schematic view of the first embodiment of the present invention.

Next, preferred embodiments of the present invention will be explained with reference to the accompanying drawings. First, FIG. 1 shows the case where a cooking container 2 used in the present invention is put on an induction heating type microwave cooking apparatus 1. A bubble generator 3 made of porous ceramics is disposed at the bottom of this cooking container 2. To blow air into water (hot water) W as a to-be-heated material from this bubble generator 3 and to generate bubbles, fine pores formed in the bubble generator 3 are used as air ports 3a.

The temperature of water inside this cooking container 2 is measured by a temperature sensor 4, and the quantity of water W is measured by a level sensor 5. The signals outputted from these sensors are inputted to a heating control circuit 7 and a water feed control circuit 8 that are disposed in a controller 6. The heating Control circuit 7 controls a power control device 9 of the microwave cooking apparatus 1 and the water feed control circuit 8 controls an opening/closing operation of a solenoid valve 12 of a feed water pipe 11 connected to a service water pipe 10.

The bubble generator 3 is connected to an air compressor 13 disposed outside the cooking container 2 through an air pipe 14, and discharges air pressure-fed from the air compressor 13 as the bubbles.

When the bubbles are discharged from the bubble generator 3 into hot water W, the bubbles expand due to the heat, rise from a lower layer portion to an upper layer portion of the cooking container 2 and become greater in size. In other words, a bubble stream as a mixture of a liquid phase with a small mount of the gaseous phase is formed at the lower layer portion of the cooking container 2, while a slag stream consisting of a mixture of the liquid phase with large amounts of the gaseous phase is formed at the upper layer portion of the cooking container 2.

Figure 2:
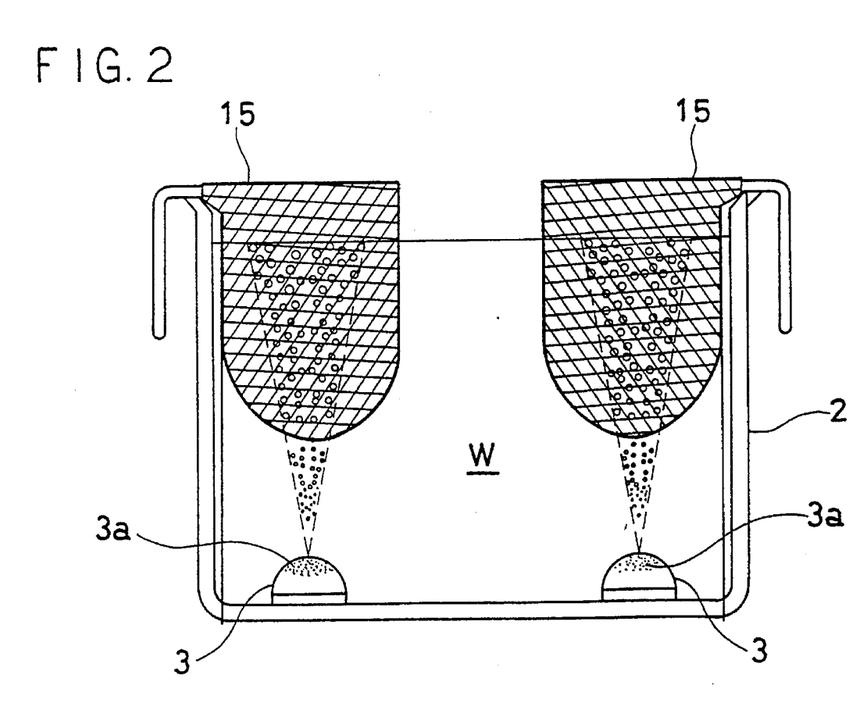
FIG. 2 is a partly sectional view of the second embodiment of the present invention.
Figure 3:
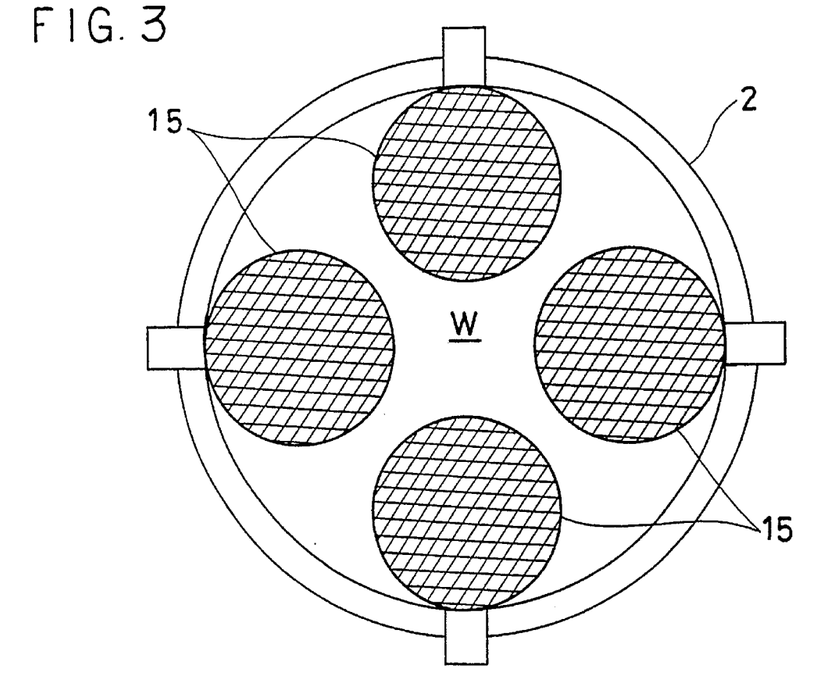
FIG. 3 is a plan view of FIG. 2.

When noodles are boiled as shown in FIGS. 2 and 3, for example, depots 15 are hooked on the periphery of the cooking container 2 and the noodles are put into the depots 15. Then, the bubbles discharged from the air ports 3a of a plurality of bubble generators 3 disposed around the periphery of the cooking container 2 into hot water W become greater in size due to thermal expansion, though the air quantity is small, and turn into bubble jet streams having stirring force sufficient to loosen the noodles at the upper layer portion of the cooking container 2.

As described above, it is not necessary according to the present invention to form a two-phase stream of the vapor and hot water W, and fluidization and stirring of hot water W and the noodles can be accomplished without boiling hot water W. Accordingly, the calorie necessary for heating can be drastically reduced.

Further, fluidization and stirring can be effected independently of heating by controlling the intensity and occurring positions of the bubble jet streams or the calorie of heating.

Figure 4:
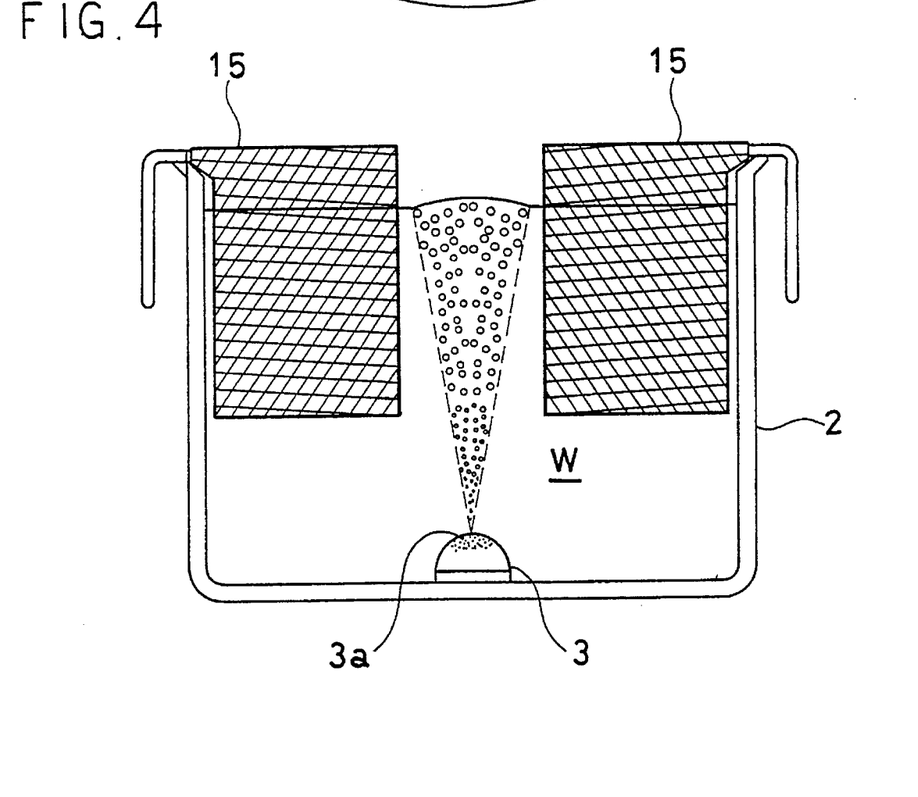
FIG. 4 is a partly sectional side view of the third embodiment of the present invention.
Figure 5:
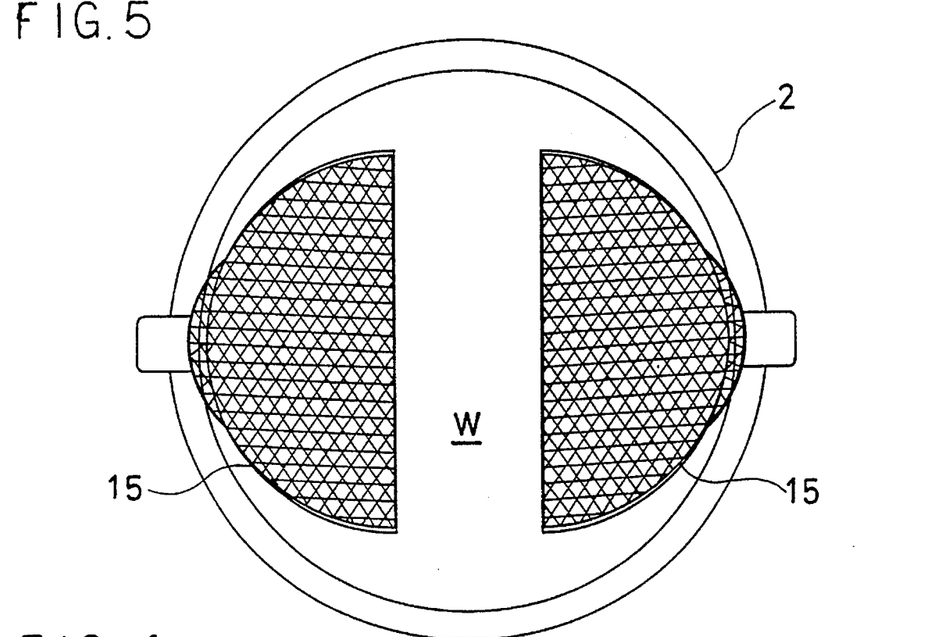
FIG. 5 is a plan view of FIG. 4.

When only one bubble generator 3 is disposed at the center of the cooking container 2 as shown in FIGS. 4 and 5, the noodles inside the depots 15 are not directly fluidized and stirred by the two-phase stream consisting of the mixture of hot water and the bubbles but are stirred by the strong convection that is generated by the ascending stream of the bubbles discharged from the air ports 3a. In consequence, the noodles can be loosened without boiling water W, in the same way as in the embodiment described above.

Figure 6:
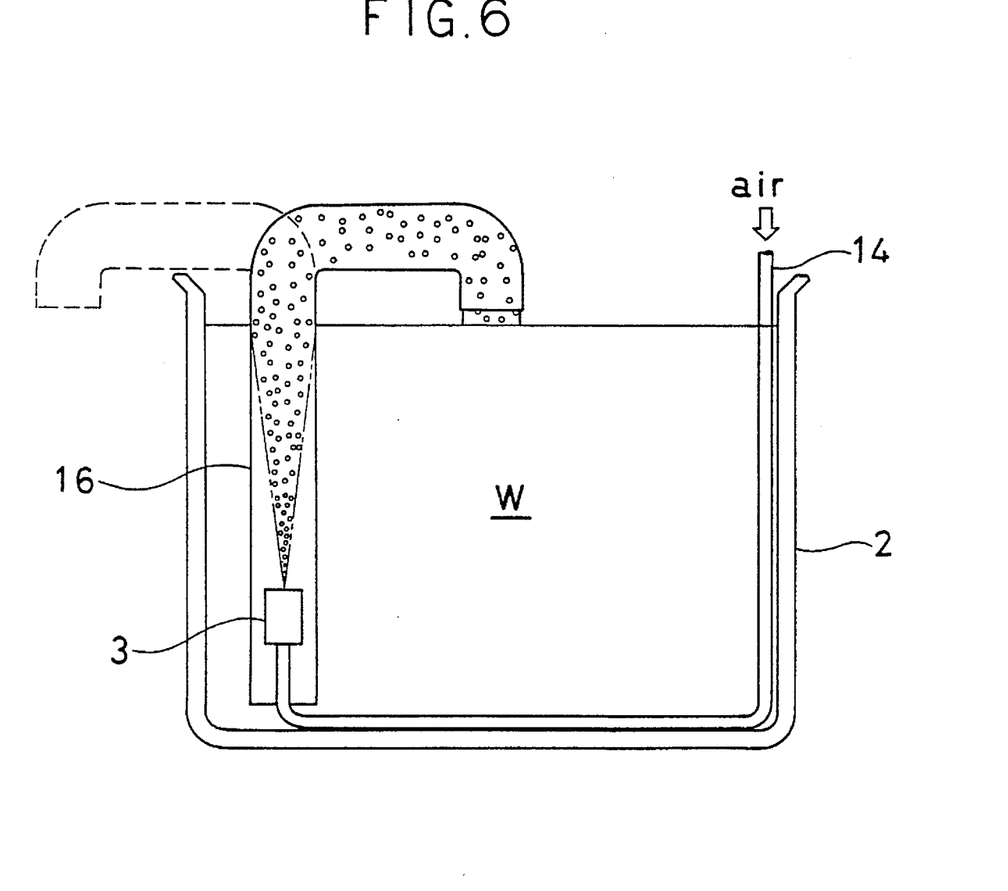
FIG. 6 is a partly sectional side view of the fourth embodiment of the present invention.

The method of generating the bubbles inside hot water W to form the two-phase stream and generating the strong convection in hot water W for stirring is not limited to the method described above. It is also possible to store the bubble generator 3 inside a mixing cylinder 16, to temporarily form the two-phase stream of hot water W and the bubbles in the cylinder 16 and to pour it into hot water W inside the cooking container 2, as shown in FIG. 6.

The experiments carried out by the present inventor have demonstrated the following result. In comparison with the case where water was heated to 100° C. (212° F.) and boiled so as to stir the noodles by the resulting vapor according to the prior art, when the water temperature was kept at 95° C. (203° F.) but was not boiled and the noodles were stirred by the bubbles generated from the bubble generator 3 according to the present invention, the noodle boiling time could be reduced to about 70% and the calorie required for heating could be reduced to about 40% in the case where the air quantity was so adjusted as to attain substantially the same stirring force.

There is no problem even when the noodles are boiled at a lower temperature so as to convert them to a paste. Therefore, the energy saving effect can be further improved and the noodle boiling time can be further reduced by lowering further the heating temperature and setting the position of the bubble generator 3 and its air quantity so that the bubble jet stream efficiently stirs the noddles.

Figure 7:
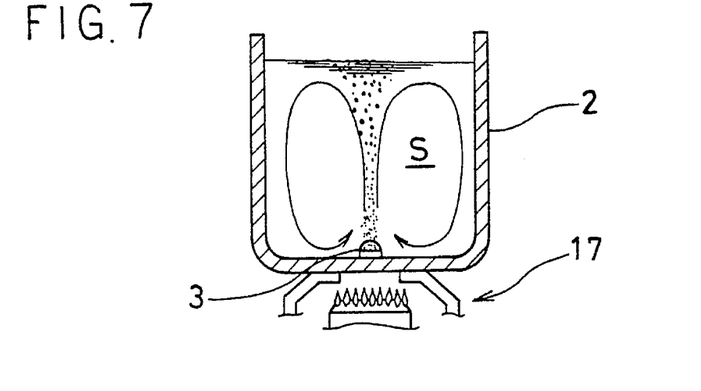
FIG. 7 is a partly sectional side view of the fifth embodiment of the present invention.

FIG. 7 shows an apparatus according to another embodiment of the present invention. This embodiment uses a hydrocarbon gas as the fuel, and is directed to cooking of soup at a relatively low temperature of around 70° C. (158° F.). The bubbles are generated from the bubble generator 3 while soup S inside the cooking container 2 placed on the gas range 17 is kept under the state where it is not boiled.

Under such a relatively low temperature condition, convection hardly occurs in soup S unless the bubbles are discharged from the bubble generator 3. For, heating power is so weak as to fluidize the ingredients of the soup stock and to circulate them inside the cooking container 2. Only when the cooking method and apparatus according to the present invention are applied, the convection sufficient enough to stir the ingredients of the soup stock is generated by the bubbles emitted from the bubble generator 3.

If the air quantity is made great in such a case, the convention occurs inside the cooking container 2 and the Soup stock is finely pulverized and mixes with soup S, so that soup S becomes turbid and the taste is deteriorated. It is therefore advisable to keep the air quantity at a rather low level so as to generate the convection devoid of predetermined turbulence as shown in the drawing. In this case, since the temperature of soup S is relatively low, the expansion ratio of the bubbles is small and waves occurring on the water surface are gentle, too. Accordingly, the occurrence of the turbulent flow can be prevented more reliably.

Figure 8:
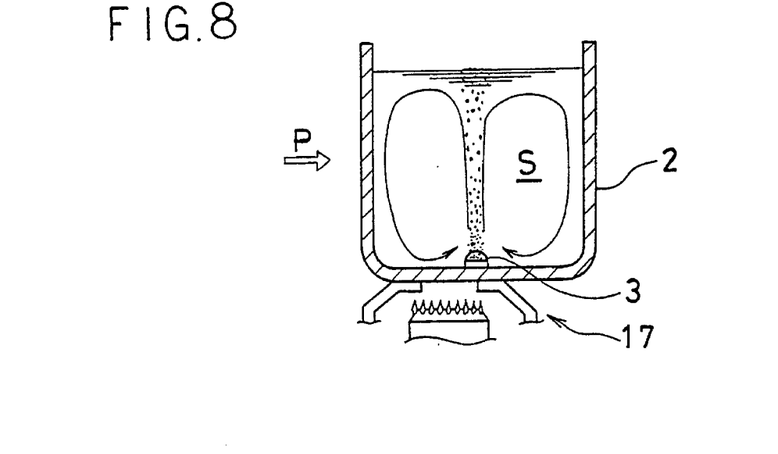
FIG. 8 is a partly sectional side view showing the state where the positional relationship between a cooking container and a gas range is deviated in a transverse direction from the state shown in FIG. 7.

Even if the cooking container 2 is erroneously pushed in a direction indicated by an arrow P shown in FIG. 8 and is deviated from the gas range 17 during cooking, the convection occurring in soup S is defined by the ascending flow of the bubbles generated from the bubble generator 3. In this way, the occurrence of turbulence in the convection can be prevented.

Figure 9:
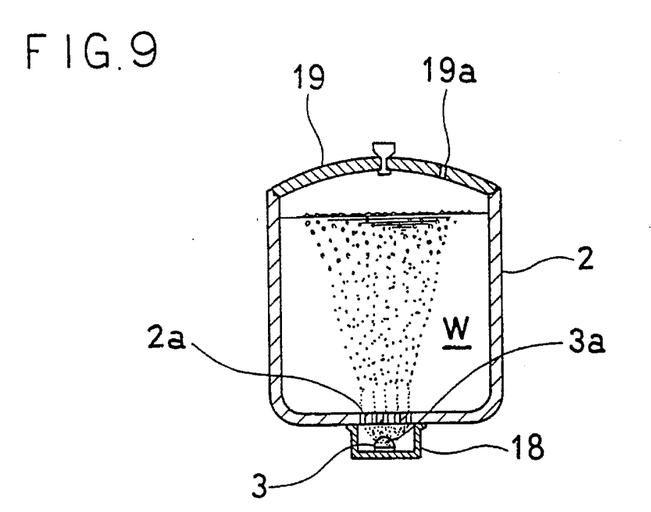
FIG. 9 is a partly sectional side view of the sixth embodiment of the present invention.

An apparatus according to still another embodiment of the present invention is shown in FIG. 9. (However, the heater is omitted.) A casing 18 is fitted to the outside of the bottom of the cooking container 2 and the bubble generator 3 is stored in this casing 18. The casing 18 and the cooking container 2 are allowed to communicate with each other through vent holes 2a so as to discharge the bubbles into the cooking container 2.

In this case, the bubbles sent through the air ports 3a of the bubble generator 3 are not directly discharger into hot water W inside the cooking container 2 but are discharged into the casing 18 and then the ascending stream of the bubbles is generated from a relatively large area of the bottom portion of the cooking container 2 through the vent holes 2a. Accordingly, the bottom of the cooking container 2 having the vent holes 2a bored therein function as a kind of a diffusion plate, and the ascending stream of the bubbles is generated over a broad range inside the cooking container 2.

Further, this embodiment improves heat efficiency by disposing a cover 19 to the cooking container 2 so as to reduce heat diffused from the water surface. The present invention can obtain the optimum fluidization/stirring action by adjusting the air quantity. Therefore, it is not necessary to remove the cover and to stir and the occurrence of burning can be prevented by the sufficient convection operation. Therefore, heating can be continued till the end of cooking without removing the cover 19. Incidentally, an air exhaust hole 19a for discharging air from the bubble generator 3 is bored in the cover 19 used in this embodiment.

Figure 10:
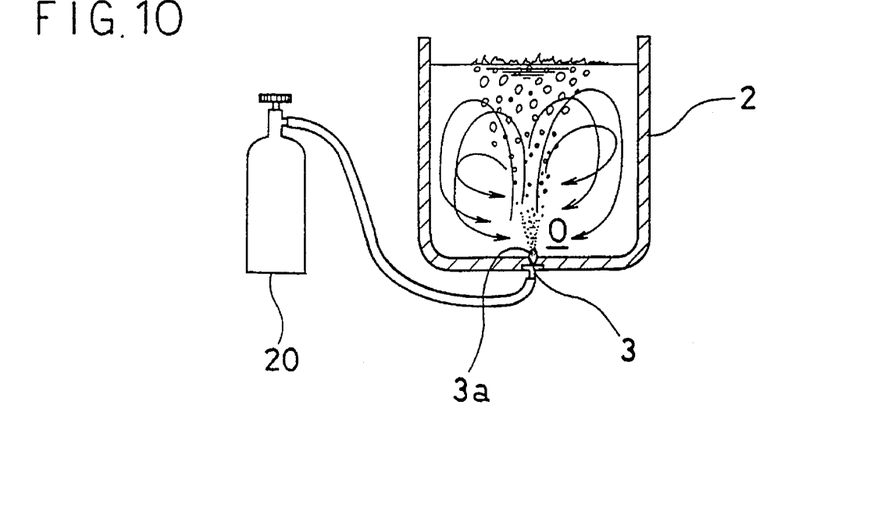
FIG. 10 is a partly sectional side view of the seventh embodiment of the present invention.

Next, in still another embodiment of the invention shown in FIG. 10, the bubble generator 3 is formed integrally with the cooking container 2, and the air port 3a functions as an opening of the bubble generator 3 shaped into the nozzle form. (The heating device is omitted from the drawing.) When the bubble generator 3 is shaped into the nozzle form in this way, the aperture may be of an ordinary one-hole type but in this embodiment, the opening is shaped as a multi-hole type air port 3a.

This embodiment illustrates an example using oil O such as when frying tempura and fried foods. Generally, frying is carried out by heating the oil O to 160° to 200° C. (320° to 392° F.). Therefore, the heat expansion ratio of the bubbles becomes great, and the stirring potion becomes extremely great even by a small air quantity. In such a case, the waves occurring on the oil surface due to the ascending stream of the bubbles become also very great, and a strong stirring stream occurs inside the oil O in the cooking container 2 as show in the drawing.

After the cooking materials are put into the oil O, the floating cooking materials lower the oil temperature at the upper layer portion near the oil surface. Even in such a case, the oil temperature at the upper layer portion quickly recovers to the predetermined oil temperature and keeps it due to the great stirring force. Therefore, cooking can be made within a short time while keeping the taste of the cooking materials.

The gas to be blasted in this case is preferably an inert gas or a nitrogen gas in order to prevent oxidation of the oil, and is preferably supplied from a gas bomb 20 packed with such a gas.

Figure 11:
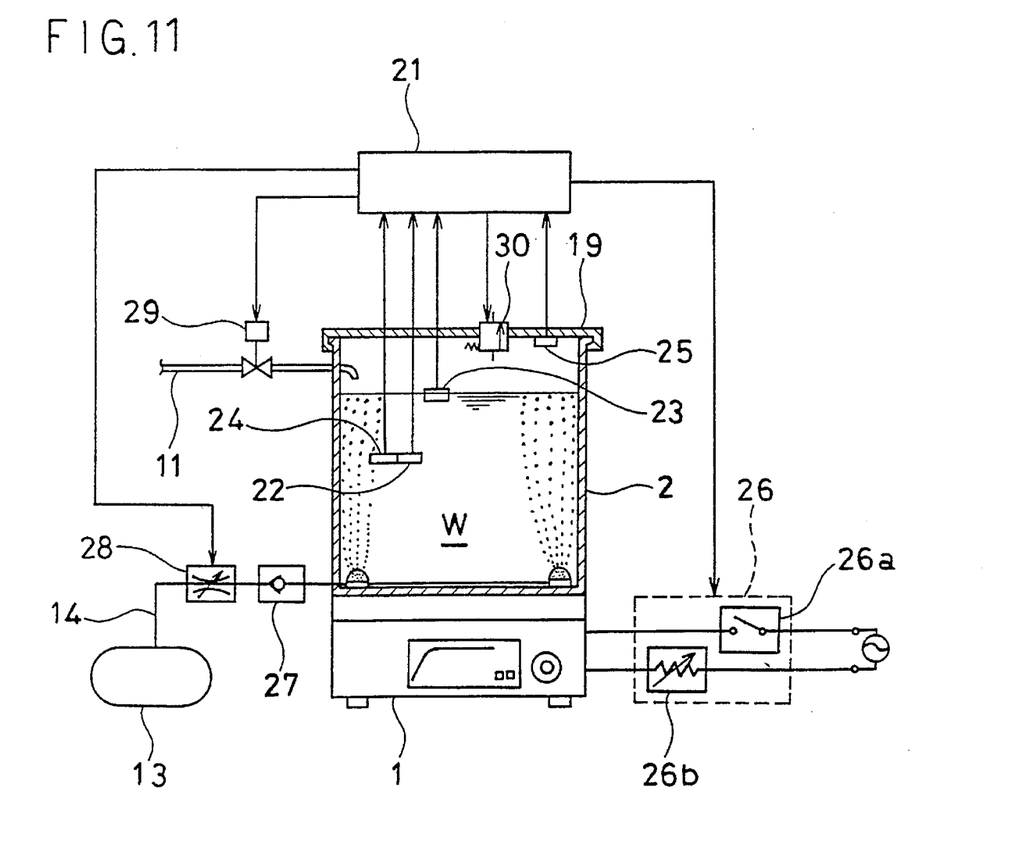
FIG. 11 is a schematic view of the eighth embodiment of the present invention.

Next, in still another embodiment of the invention shown in FIG. 11, the cooking container 2 is constituted into a kind of a pressure pan by providing it with pressure regulation means, and a controller 21 is further disposed so as to automatically control the water temperature (oil temperature), the water quantity (oil quantity), the air quantity and the internal pressure of the cooking container 2. Though all of them may be controlled manually, automatic control is more preferred so as to save labor and to prevent failure of cooking.

Signals from a water temperature (oil temperature) sensor 22, a water quantity (oil quantity) sensor 23, a flow rate sensor 24 and a pressure sensor 25 are inputted to the controller 21.

The controller 21 outputs the output signals to a control unit 26 so as to control a power switch 26a of the microwave cooking apparatus 1 and an output level switch 26b. Opening/closing and a flow rate of a flow rate regulation valve 28 of an air pipe 14, which is equipped with a check valve 27 for preventing the inflow of water W inside the cooking container 2 into the air compressor 13 side, are also controlled and furthermore, opening/closing and flow rate control of a valve 29 of the feed water (feed oil) pipe 11 is also made.

In this embodiment, a pressure regulation valve 30 for regulating the pressure inside the cooking container 2 is provided to the cover 19, and control is effected in such a manner as to escape the gas sent from the bubble generator 3 to the outside from this pressure regulation valve 30 so that the pressure inside the cooking container 2 attains a suitable pressure.

Because the pressure inside the cooking container 2 is regulated in the manner described above, the setting temperature of the boiling point can be controlled and the loss of energy used for heating as the latent heat of vaporization can be minimized to further improve energy saving. In the present invention, the bubble generator 3 is disposed so as to send the gas into the cooking container 2. Therefore, even when the cover 19 is opened during cooking and the pressure drops to the normal temperature, the pressure can immediately return to the set pressure as soon as the cover is again closed.

The controller 21 can be so constituted as to either individually or collectively control the various regulator means described above, that is, the control unit 26, the flow regulation valve 28, the valve 28 and the pressure regulation valve 30, by the signal input of the sensors. If a timer is provided to the controller 21, the time control function can be added to each of these regulators. Further preferably, the control condition can be made variable during cooking so that the optimum cooking condition can be obtained from the start to the end of cooking.

A display device for displaying the measured value of each of the sensors and an alarm device for notifying the trouble of each regulation means may further be provided.

The present invention is not limited to each of the embodiments described above and to their combinations. In short, the gist of the invention resides in that the bubbles are generated by sending the gas into the to-be-heated materials inside the cooking container 2 such as water, the oil, soup, broth, etc, and the cooking materials are heated and cooked while being fluidized and stirred by the ascending stream of the bubbles. According to this construction, the two-phase stream consisting of the mixture of the liquid phase and the gaseous phase can be generated without boiling the to-be-heated materials, the heating temperature and the intensity of the stirring stream can be freely combined under the most suitable condition for cooking the respective materials, and freedom of cooking can be drastically improved.

What is claimed is:

1. A cooking apparatus comprising:

a cooking container for receiving to-be-heated materials therein;

a bubble generator having air holes for sending air into and generating bubbles in the to-be-heated materials received in said cooking container;

an air pipe operationally connected to said bubble generator and disposed on an inner wall surface of said cooking container:

wherein said air holes are arranged in said cooking container, at positions facilitating fluidization and stirring of said to-be-heated materials; and a temperature regulating means for varying a temperature of said to-be-heated materials operationally connected to said cooking container and a generation quantity regulating means for making the generation quantity of bubbles variable, operationally connected to said bubble generator means.

2. A cooking apparatus as claimed in claim 1, further comprising a controller means for automatically controlling at least one of said temperature regulating means or said generation quantity regulating means.

3. A cooking apparatus as claimed in claim 1, further comprising a pressure regulating means for varying a pressure inside said cooking container.

4. A cooking apparatus comprising:

a cooking container for receiving to-be-heated materials therein;

a bubble generator having air holes for sending air into and generating bubbles in the to-be-heated materials received in said cooking container;

wherein said air holes are arranged in said cooking container, at positions facilitating fluidization and stirring of said to-be-heated materials:

a temperature regulating means for varying a temperature of said to-be-heated materials operationally connected to said cooking container and a generation quantity regulating means for making the generation quantity of bubbles variable, operationally connected to said bubble generator means:

a pressure regulating means for varying a pressure inside said cooking container; and a controller for automatically controlling said pressure regulating means.

5. A cooking apparatus comprising:

a cooking container for receiving-to-be-heated materials therein;

a bubble generator having air holes for sending air into and generating bubbles in the to-be-heated materials received in said cooking container;

wherein said air holes are arranged in said cooking container at positions facilitating fluidization and stirring of said to-be-heated materials:

a temperature regulating means for varying a temperature of said to-be-heated materials operationally connected to said cooking container and a generation quantity regulating means for making the generation quantity of bubbles variable, operationally connected to said bubble generator means: and a quantity regulating means for varying a quantity of said to-be-heated materials.

6. A cooking apparatus as claimed in claim 5 which further comprises a controller for automatically controlling said quantity regulating means.

* * * * *